Sept. 14, 1926.  
G. B. HAVEN  
1,599,964  
METHOD OF AND MEANS FOR MEASURING POROSITY  
Filed Jan. 9, 1926
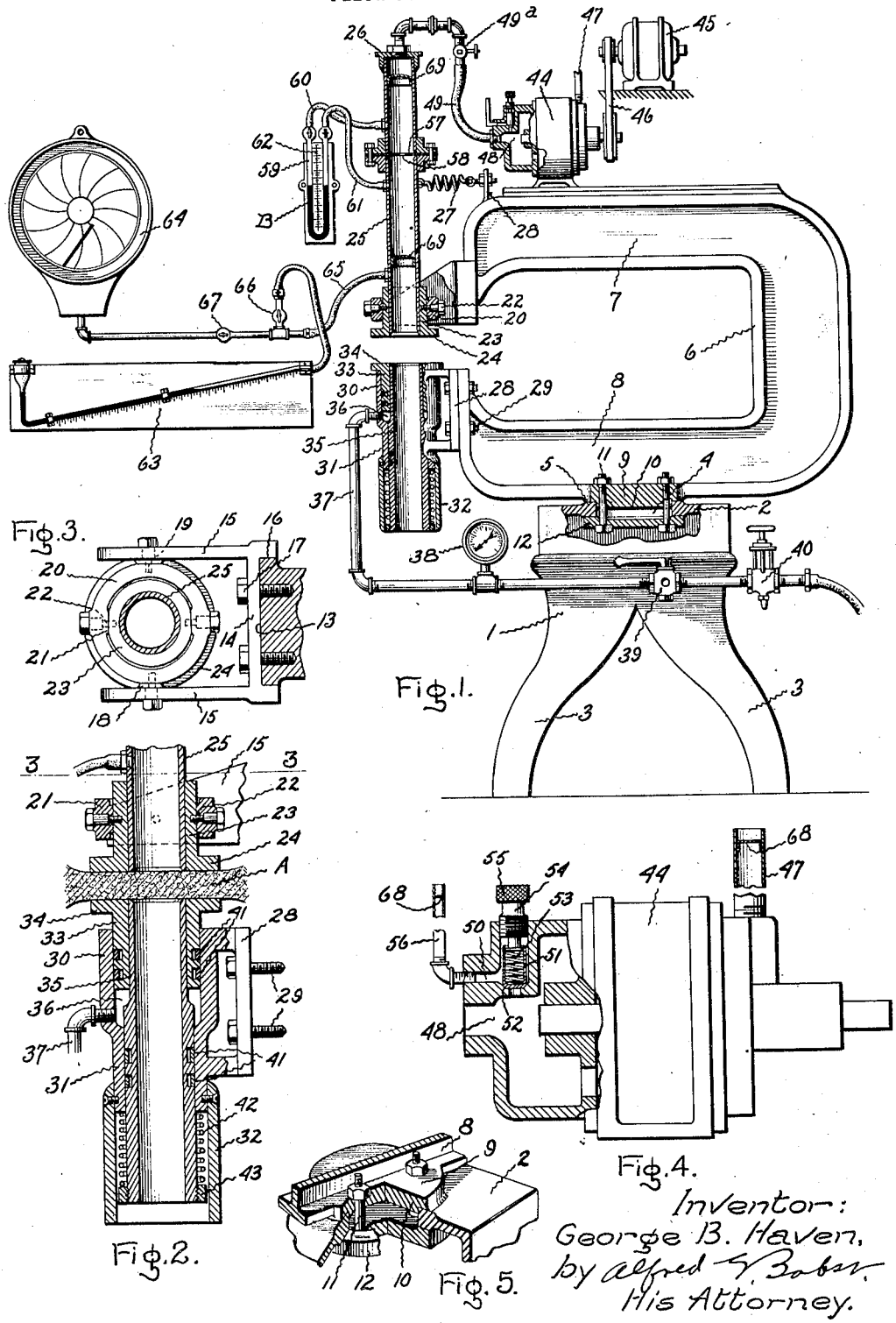
Inventor:  
George B. Haven,  
by Alfred G. Baber  
His Attorney.

Patented Sept. 14, 1926.

1,599,964

UNITED STATES PATENT OFFICE.

GEORGE B. HAVEN, OF NEEDHAM, MASSACHUSETTS, ASSIGNOR TO ALBANY FELT COMPANY, A CORPORATION OF NEW YORK.

METHOD OF AND MEANS FOR MEASURING POROSITY.

Application filed January 9, 1926. Serial No. 80,335.

As is known, many fabrics and other substances depend for their usefulness on their ability either to restrain or to permit the passage of gases or liquids through them. As a result, the measurement of the quality of porosity is of considerable importance.

The object of my invention is to provide an improved method of and means for measuring the porosity of a substance, such as a fabric, for example, and for a consideration of what I believe to be novel, and my invention, attention is directed to the following description and the claims appended thereto.

In the drawing, Fig. 1 is a side elevation, partly in section, of a machine embodying my invention and by the use of which my improved method may be carried out; Fig. 2 is a detail sectional view of certain of the parts shown in Fig. 1; Fig. 3 is a sectional plan view taken on line 3—3, Fig. 2; Fig. 4 is a detail view, partly in section, of a form of blower which may be utilized in carrying out my invention, and Fig. 5 is a detail perspective view, partly broken away, of certain parts.

I have found that the passage of a fluid, in the form either of a liquid or a gas, through the interstices of a substance such as a heavy fabric for example, is a direct function of the similar passage of atmospheric air through such substance. It follows, therefore, that by measuring the resistance which a substance offers to the passage of air through it, I can measure and determine its porosity in suitable terms.

According to my improved method, I measure the resistance which the substance offers to the passage of air through it by measuring the pressure required to effect the continuous flow of a uniform measured volume of air through a unit area or definite area of the substance. I have found that the pressure so required is a direct function of the porosity of the substance and forms a measure of its porosity. Or, otherwise expressed, I have found that with the quantity of air passing through the fabric kept constant in amount, the porosity was directly related by a fixed law to the pressure building up upon the face of the fabric where the air started to pass through it.

Any suitable means may be employed in carrying out my improved method. One such means, and an arrangement I now prefer is illustrated in the drawing.

Referring to the drawing, 1 indicates a base comprising a top wall 2 and supporting legs 3. In top wall 2 is a circular opening 4 surrounded by a raised finished surface 5. 6 indicates a frame which is U-shaped and comprises two arms, an upper arm 7 and a lower arm 8. Lower arm 8 is provided with a circular base 9 which rests on finished surface 5 and has a circular centering projection 10 which projects down into opening 4. Frame 6 is attached to top wall 2 by a suitable number of bolts 11 which extend through base 9 and through a plate 12 located beneath top wall 2. When the nuts on top of bolts 11 are tightened, the edge of the wall surrounding opening 4 is clamped between surface 5 and the opposed surface on plate 12. This serves to clamp frame 6 to base 1. As will be clear, by loosening the nuts on bolts 11, frame 6 may be turned on its vertical axis relatively to base 1 to any desired position, and it may be fastened in the desired position by tightening the nuts again.

The forward end of upper arm 7 is provided with a flat surface 13 to which is fastened a yoke comprising a base 14 and spaced arms 15. In the present instance base 14 is shown as being provided with a recess 16 in which the forward end of arm 7 fits and as being fastened to it by studs 17. However, any suitable fastening arrangement may be used. The opposed surfaces of arms 15 are provided with raised surfaces 18 from which project bearing pins 19, and mounted on pins 19 is a gimbal ring 20. Gimbal ring 20 is provided with opposed raised surfaces 21 from which project pivot pins 22, and pivotally mounted on pins 22 is a sleeve 23, the lower end of which is provided with a flange 24. Rigidly fixed in sleeve 23 in any suitable manner is a tube 25. The lower end of tube 25 is substantially flush with the lower end of sleeve 23 and is open. The upper end of tube 25 is closed by a tight fitting cover 26. With the above described arrangement, it will be seen that tube 25 and flanged sleeve 23 form, in substance, a unitary structure or conduit which is mounted between arms 15 on a gimbal or universal joint. To maintain tube 25 normally vertical but still permit of its moving on its gimbal mounting, it is connected to upper arm 7 by means of a spring 27 of suitable stiffness. One end of spring 27 is fastened in an eye on tube 25 and the other end is adjustably connected to a small bracket 28 on the arm. The stiffness of spring 27 is such that normally it holds tube 25 stationary in vertical position but permits of the tube moving on its universal mounting in any direction when pressure is applied to a side of the tube.

The forward end of lower arm 8 is provided with a flat surface to which a bracket 28 is fastened in any suitable manner, such as by means of the bolts 29. Formed integral with bracket 28 and rigidly supported by it is a cylinder structure comprising an upper cylinder 30 of suitable diameter and a lower cylinder 31 of a diameter somewhat less than the diameter of cylinder 30. Attached to the lower end of lower cylinder 31 is a tubular spring guard or shield 32. In upper cylinder 30 is a sleeve 33 having a flange 34 on its outer end. Fixed in sleeve 33 in any desired or suitable manner is a tube 35, the upper end of which is flush with the upper end of the sleeve. Tube 35 projects down through lower cylinder 31 and its lower end beginning at a point somewhat below the lower end of sleeve 33 is enlarged in outside diameter by increasing the thickness of its wall, so that it fits lower cylinder 31. There is thus provided an annular cylindrical chamber 36 between upper cylinder 30 and lower cylinder 31.

Connected to chamber 36 is a pipe 37 which at its other end is connected to a source of fluid under pressure. For example, it may connect to a suitable source of air pressure. Connected to pipe 37 is a pressure gauge 38 and arranged in pipe 37 is a three way control valve 39 and a suitable pressure reducing valve 40. Valve 39 is arranged so that in one position it connects chamber 36 to the air pressure supply and in another position it disconnects it from the air pressure supply and connects it to a region of lower pressure, such as to atmosphere. Sleeve 33 and tube 35 are provided with suitable packing rings 41 to prevent leakage from chamber 36. Surrounding the lower end of tube 35 is a spring 42 arranged between the lower end of cylinder 31 and a collar 43 threaded onto the lower end of tube 35. This spring serves to normally hold sleeve 33 and tube 35 in their lowermost position with flange 34 in engagement with the top of cylinder 30. Sleeve 33 and tube 35 are rigidly fastened together and form in substance a unitary cylindrical piston which moves in the cylinder structure comprising cylinders 30 and 31.

Tube 25 with flange 24 at its lower end and tube 35 with flange 34 at its upper end stand in vertical alignment with each other and are adapted to clamp between them the substance the porosity of which is to be measured. In Fig. 2, this substance is indicated at A. When a substance, such as the substance A, is clamped between flanges 24 and 34, as is shown in Fig. 2, tubes 25 and 35 form a continuous conduit open at its lower end and across which conduit the substance A extends at a point intermediate between the two ends of the conduit. This forms an arrangement whereby a definite area of substance A may be subjected to air pressure to effect passage of air through it.

Connected to the upper end of tube 25 is a means whereby a definite measured volume of air may be supplied continuously to tube 25. Any suitable means may be utilized for this purpose. Preferably I employ a suitable air pump or air blower and regulate it so that it supplies continuously a constant volume of air to tube 25 irrespective of the pressure in the tube. 44 indicates a rotary blower which may be mounted in any suitable manner and driven by any suitable means. In the present instance, it is shown as being mounted directly on top of frame 6 adjacent to its forward end and as being driven by an electric motor 45 which is connected to it by a belt 46. Motor 45 may be mounted adjacent to blower 44 in any convenient manner. It is shown in the present instance as being located above it. This arrangement, however, is only by way of example, and for illustrative purposes. The blower and motor may be arranged advantageously side by side on top of the frame arm 7.

Blower 44 is provided with an inlet conduit 47 which communicates with the atmosphere and with a discharge conduit 48 which is connected by a pipe 49 to the top of tube 25. Communicating with discharge conduit 48 is a by-pass conduit or waste passage 50 which is controlled by an outwardly opening pressure relief valve 51 which is biased toward a seat 52 by a spring 53. Spring 53 may be adjusted by means of a member 54 which threads into an opening in the blower casing. The inner end of member 54 engages spring 53 and the outer end is provided with a knurled head 55 for use in turning the member. By adjusting spring 53, the pressure at which valve 51 opens may be regulated. Connected to waste passage 50 is a waste pipe 56.

In tube 25 adjacent to its upper end is arranged a pressure difference creating device which creates a pressure difference which bears a definite relation to the rate of flow of fluid through the tube. In the present instance, this device is in the form of a plate 57 having an orifice 58 in it, this being a known form of pressure difference creating device. Connected to tube 25 is a means for measuring the drop in pressure across orifice plate 57. It is shown as comprising a U-tube 59 having one leg connected to tube 25 above orifice plate 57 by a pipe 60 and its other leg connected to tube 25 below orifice plate 57 by a pipe 61. Pipe 60 forms the leading pressure connection and pipe 61 forms the trailing pressure connection. In U-tube 59 is a suitable indicating liquid B. The upper ends of the columns of indicating liquid cooperate with a suitable scale plate 62 for indicating the deflection of the liquid in the U-tube.

When fluid flow takes place through conduit 25, there is a drop in pressure across orifice plate 57 which is a measure of the volume of flow. The drop in pressure across the orifice plate is measured by the deflection of the liquid in U-tube 59. It follows, therefore, that if blower 44 is regulated to maintain a constant deflection of the liquid in U-tube 59, there will be maintained a constant volume of flow through tube 25, since there will be a constant drop in pressure across orifice plate 57. The regulation of the blower to maintain a constant drop in pressure across orifice plate 57 may be effected by means of regulating spring 53, by regulating the speed of motor 45, by regulating a suitable valve 49ᵃ in discharge pipe 49, or in any suitable manner.

Connected to tube 25 adjacent to its lower end is suitable means for measuring the pressure obtaining in this portion of the tube. In the present instance, this means is shown as comprising an inclined pressure gauge 63 and a recording pressure gauge 64 which are connected to tube 25 in multiple by a pipe 65. 66 and 67 are valves for use in connecting the gauges to and disconnecting them from tube 25.

U-tube 59 and gauges 63 and 64 are shown as being located at one side of frame 6. This arrangement is diagrammatic and for purposse of illustration. In actual practice, these instruments may be and preferably are mounted directly on frame 6 in any suitable manner.

In pipes 47, 49 and 56 are arranged suitable screens 68 for preventing foreign matter such as dirt from being carried into tube 25 and thence down onto the fabric or other material being tested. This prevents the material from being soiled. In tube 25 on each side of orifice plate 57 and spaced a suitable distance from it are baffle screens 69 which serve to secure uniformity of flow across the entire area of tube 25.

When the machine is not in use, valve 39 stands in the position to shut off the air pressure and to connect annular cylinder 36 to atmosphere, and spring 42 holds flange 34 down against the top of cylinder 30 as is shown in Fig. 1. When the machine is to be used, the material A, the porosity of which is to be measured, is inserted between flanges 24 and 34 and valve 39 turned to admit compressed air to annular cylinder 36. This raises the piston structure comprising sleeve 33 and tube 35 and clamps material A between flanges 24 and 34, as is shown in Fig. 2. The pressure being utilized is shown on gauge 38 and is turned on until the material A is clamped tight enough so that no leakage will take place radially outward through the material between the flanges.

Blower 44 is now operated and is regulated in any of the ways pointed out above until differential pressure gauge 59 indicates that the desired predetermined drop in pressure across orifice plate 57 obtains. This means then that the desired constant volume of air is being supplied continuously by blower 44 to tube 25. This air flows down tube 25, through material A, and out at the bottom of tube 35. To effect the flow of this predetermined volume of air through material A requires that a certain definite pressure must exist in advance of the material A as regards the direction of flow, and it will be understood that blower 44 is regulated so that it delivers air at a pressure such that the predetermined constant volume of air will be forced to flow continuously through orifice 58 and material A. The pressure in advance of material A is indicated on pressure gauge 63 and is recorded on gauge 64. As is pointed out above, this pressure is a measure of the porosity of material A. The instruments 63 and 64 may be calibrated to indicate pressure directly or they may be calibrated to indicate porosity in terms which refer to any desired standard.

After the porosity determination has been made, valve 39 is turned to relieve the pressure in annular cylinder 36 whereupon spring 42 forces sleeve 33 and tube 35 downward to separate flanges 24 and 34 and release material A.

In the use of the machine, the material, the porosity of which is to be determined, may be sometimes of uneven and varying thickness. By providing a universal mounting for tube 25 and by holding it yieldingly in vertical position by spring 27, the tube can tilt in any direction when necessary, to accommodate uneven or varying thicknesses of material. Thus it is insured that the material will be clamped firmly in each instance. In this connection, it will be noted that the various connections to tube 25 are made flexible by the use of suitable flexible material such as rubber tubing, so that the connections will not interfere with movements of the tube 25 on its universal mounting.

The machine is especially well adapted for measuring the porosity of a fabric and in order to measure the porosity at any position in the case of a wide fabric the frame of the machine is made U-shaped as shown. In the cavity thus provided inside the machine frame any portion up to the whole width of the fabric may be accommodated while taking porosity measurements at frequent intervals across the width.

Since frame 6 of the machine is swiveled on base 1, it may be turned to receive fabric from various positions. This is of great convenience in the use of the machine. The arrangement is such that frame 6 may be turned on base 1 throughout a complete revolution.

By my improved method, I am enabled to measure accurately the porosity of a material, such as a fabric; and by the use of my improved machine, the method may be carried out quickly and easily and with the required degree of accuracy.

In accordance with the provisions of the patent statutes, I have described my improved method and the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The method of measuring the porosity of a substance which comprises measuring the pressure required to maintain a constant rate of flow of air through a definite area of the substance.

2. The method of measuring the porosity of a substance which comprises segregating a definite area of the substance and measuring the pressure required to maintain a constant rate of flow of air through such area.

3. In a machine for measuring the porosity of a substance, the combination of means for segregating a definite area of the substance, means for maintaining a constant rate of flow of air through such segregated area, and means for measuring the pressure required to effect such flow.

4. In a machine for measuring the porosity of a substance, the combination of a conduit, means for clamping a substance across the conduit, means for maintaining in the conduit a constant rate of flow of air, and means for measuring the pressure required to maintain such constant rate of flow of air through the substance.

5. In a machine for measuring the porosity of a substance, the combination of a conduit having a flange at one end, a second conduit having a flange at one end, means for moving said conduits toward each other to clamp a substance between said flanges, means for maintaining a constant rate of flow of air through said conduits, and means for measuring the pressure required to force such air through a substance clamped between said flanges.

6. In a machine for measuring the porosity of a substance, the combination of a conduit, means for supplying air to said conduit, means associated with the conduit for measuring the volume of air flowing through the conduit, means for regulating the air supplying means to maintain constant the volume of air supplied to the conduit per unit of time, and means whereby a substance, the porosity of which is to be determined, may be clamped across said conduit.

7. In a porosity measuring machine, a U-shaped frame comprising two arms, conduits carried by said arms, means whereby a substance may be clamped between adjacent ends of said conduits, means for maintaining a constant rate of flow of air through said conduits, and means for measuring the pressure in the conduits in the region in advance of said clamping means.

8. In a porosity measuring machine, a U-shaped frame comprising two arms, a conduit connected to one of said arms by a universal joint, a conduit connected to the other arm, said conduits being in alignment, means for moving the second named conduit toward the first named conduit, whereby a substance may be clamped between them, means associated with said conduits for maintaining a constant rate of flow of air through the conduits, and pressure measuring means connected to said first named conduit.

9. In a porosity measuring machine, the combination of a base, a U-shaped frame connected to the base by a swivel connection, conduits carried by said frame, means whereby a substance may be clamped between said conduits, and means whereby the pressure required to force a constant volume of air per unit of time through said conduits may be measured.

10. In a porosity measuring machine, the combination of a conduit, an orifice plate in the conduit, means for measuring the drop in pressure across said orifice, a pump for supplying air to said conduit, means for regulating said pump, means for clamping a substance, the porosity of which is to be measured, across the end of said conduit, and means for measuring the pressure in the conduit adjacent to the end over which the substance is adapted to be clamped.

In witness whereof, I have hereunto set my hand and seal this 31 day of Dec., 1925.

GEORGE B. HAVEN.